(12) United States Patent
Chapman (10) Patent No.: US 11,666,839 B2
(45) Date of Patent: Jun. 6, 2023

(54) OIL FILTRATION ASSEMBLY, SYSTEM, AND METHODS OF MAKING AND USING THE SAME

(71) Applicant: Westermeyer Industries Inc., Bluffs, IL (US)

(72) Inventor: Adam T. Chapman, Winchester, IL (US)

(73) Assignee: Westermeyer Industries Inc., Bluffs, IL (US)

( * ) Notice: Subject to any disclaimer, the term of this patent is extended or adjusted under 35 U.S.C. 154(b) by 45 days.

(21) Appl. No.: 17/348,399

(22) Filed: Jun. 15, 2021

(65) Prior Publication Data

US 2021/0387117 A1 Dec. 16, 2021

Related U.S. Application Data (60) Provisional application No. 63/038,991, filed on Jun. 15, 2020.

(51) Int. Cl.
| | | |
|---|---|---|
| *B01D 35/153* | (2006.01) | |
| *B01D 35/30* | (2006.01) | |
| *F16N 39/06* | (2006.01) | |

(52) U.S. Cl.
CPC .......... *B01D 35/153* (2013.01); *B01D 35/30* (2013.01); *F16N 39/06* (2013.01)

(58) Field of Classification Search
CPC ...... B01D 35/153; B01D 35/30; B01D 29/15; B01D 2201/307; F16N 39/06
USPC ......... 210/435, 95, 282, 441–444, 447, 455, 210/485, 484, 436, 472, 439, 446
See application file for complete search history.

(56) References Cited

U.S. PATENT DOCUMENTS

| | | | |
|---|---|---|---|
| 4,478,050 A | 10/1984 | DiCarlo et al. | |
| 5,113,671 A | 5/1992 | Westermeyer | |
| 5,271,245 A | 12/1993 | Westermeyer | |
| 5,404,730 A | 4/1995 | Westermeyer | |
| 5,542,499 A | 8/1996 | Westermeyer | |
| 5,593,578 A * | 1/1997 | Bryan ................... | B01D 29/902 210/450 |
| 5,620,599 A * | 4/1997 | Hopkins .............. | B01D 36/001 55/501 |
| 7,082,785 B2 | 8/2006 | Nieter et al. | |

(Continued)

OTHER PUBLICATIONS

Tomczyk, John, "Selecting, Installing Oil Separators," Air Conditioning Heting Refrigeration the News, Oct. 29, 2013.

*Primary Examiner* — Madeline Gonzalez
(74) *Attorney, Agent, or Firm* — Alix, Yale & Ristas, LLP (57) ABSTRACT

An oil filtration assembly is described herein comprising a container having an upper end portion and a lower end portion, an oil reservoir formed on the lower end portion of the container, and a removable oil filter subassembly integrated with the upper end portion of the container. The subassembly comprises a filter housing including an inlet configured to receive oil and a filtered oil outlet configured to permit an outward flow of oil into the oil reservoir, a filter contained in the housing and disposed between the inlet and the filtered oil outlet, and a top component configured to be removed for replacement of the filter. The oil filtration-reservoir assembly further includes an inlet service valve, an oil outlet service valve and at times a service valve for the vent line. Corresponding systems and methods also are disclosed.

21 Claims, 6 Drawing Sheets

(56) References Cited

U.S. PATENT DOCUMENTS 7,810,351 B2 10/2010 Westermeyer
2006/0196220 A1 9/2006 Westermeyer

* cited by examiner

OIL FILTRATION ASSEMBLY, SYSTEM, AND METHODS OF MAKING AND USING THE SAME

RELATED APPLICATIONS

This application claims the benefit of, and priority to, U.S. Provisional Application No. 63/038,991 filed Jun. 15, 2020, the contents of which are incorporated by reference herein in their entirety.

BACKGROUND

Vapor compression refrigeration systems utilize a refrigerant as means of transferring heat from a closed space to one of higher temperature. The process involves compression of the refrigerant vapor by use of a compressor in order to transfer heat to ambient air, resulting in a phase change. Refrigerant compressors require internal lubrication to provide seals and ensure close tolerance parts move freely during operation. During the compression stages the oil can be vaporized into the refrigerant vapor and therefore escape the compressor. An oil separator is set downstream from the compressor to remove the vaporized oil from the refrigerant gas. In low pressure oil management systems, once the oil is separated it then is transferred through a filtering device and stored in a satellite oil reservoir.

It would be useful to develop improvements in oil filters to be used with refrigeration systems.

SUMMARY

One embodiment described herein is an oil filtration-reservoir assembly comprising a container having an upper end portion and a lower end portion, an oil reservoir formed on the lower end portion of the container, the oil reservoir including an oil reservoir outlet, and a removable oil filter subassembly integrated with the upper end portion of the container. The subassembly comprises a filter housing including an inlet configured to receive oil and a filtered oil outlet configured to permit an outward flow of oil into the oil reservoir, a filter contained in the housing and disposed between the inlet and the filtered oil outlet, and a top component configured to be removed for replacement of the filter. The oil filtration-reservoir assembly further comprises an inlet service valve disposed outside the filter housing and configured to control flow through the filter housing inlet, an oil outlet service valve disposed outside the container configured to control flow through the filtered oil outlet and at times, a service valve for the vent line.

Another embodiment is a method comprising obtaining an oil filtration-reservoir assembly including a container having an upper end portion and a lower end portion, an oil reservoir formed at the lower end portion of the container, the oil reservoir including an oil reservoir outlet, and a removable oil filter subassembly integrated with the upper end portion of the container. The subassembly comprises a filter housing including an inlet configured to receive oil in the form of a liquid, a filtered oil outlet configured to permit an outward flow of oil into the oil reservoir, a filter cartridge contained in the housing and disposed between the inlet and the filtered oil outlet, and a top component configured to be removed for replacement of the filter. The method further comprises feeding unfiltered oil into the filter housing inlet, and removing oil from the oil reservoir outlet.

Yet another embodiment described herein is an oil filtration assembly, comprising a. a container having an upper end portion and a lower end portion, b. an oil reservoir positioned in, or forming, the lower end portion of the container, the reservoir including a reservoir outlet, c. a serviceable oil filter subassembly integrated with the upper end portion of the container, and d. an oil outlet service valve disposed outside the container proximate the reservoir outlet. The serviceable oil filter subassembly comprises a filter housing including an oil inlet, and a filtered oil outlet positioned to permit an outward flow of oil into the oil reservoir, a filter cartridge contained in the housing and disposed between the oil inlet and the filtered oil outlet, the filter cartridge containing filtration media, an oil inlet service valve disposed outside the filter housing proximate the oil inlet, and a top component configured to be removed for replacement of at least one of the filter cartridge and the filtration media. The assembly is particularly well suited for use in cold storage systems, such as commercial refrigerator and freezer systems.

A further embodiment disclosed herein is a method of filtering oil using the oil filtration assemblies described above. Another embodiment is a method of making an oil filtration system comprising building the assemblies described above.

Yet another embodiment is a system comprising a serviceable oil filter subassembly integrated with an oil reservoir in a single unit. A further embodiment is a refrigeration system comprising a satellite oil reservoir comprising a housing that directly supports a serviceable oil filter subassembly.

DETAILED DESCRIPTION

The embodiments disclosed herein combine two refrigeration system components into a single design, thereby reducing end user material costs, labor installation costs and potential refrigerant leak joints which reduce the Global Warming Potential (GWP) of a system. This design makes use of existing components as one device in lieu of a separate set of pressure containing components.

The embodiments disclosed in the present application provide an improved design through which a serviceable oil filter housing is integrated into a satellite oil reservoir, making use of existing hardware and pressure boundary components as to combine functionality in a refrigeration system. The oil filter housing can be comprised of a carbon steel housing, inlet and outlet nozzle, pleated paper (or other media) filter cartridge with gasket and alignment guides, where said filter cartridge is held in place by a compressed spring or another suitable means of holding the filter media in place, such as a rod or piston held in place by a screw. The gasket may comprise fiber or another suitable material. The oil enters the filter through the inlet port on the side of the housing directing the oil flow path from the outside in, filtering any system debris or particulates. The oil will then drain into the integrated oil reservoir for proper oil distribution. If the oil filter element needs to be replaced, service valves located on the inlet and outlet of the assembly can be closed thereby allowing for proper evacuation of any pressure inside of the component. The top flange can unbolt and the filter can be removed by a lift tab.

Figure 1:
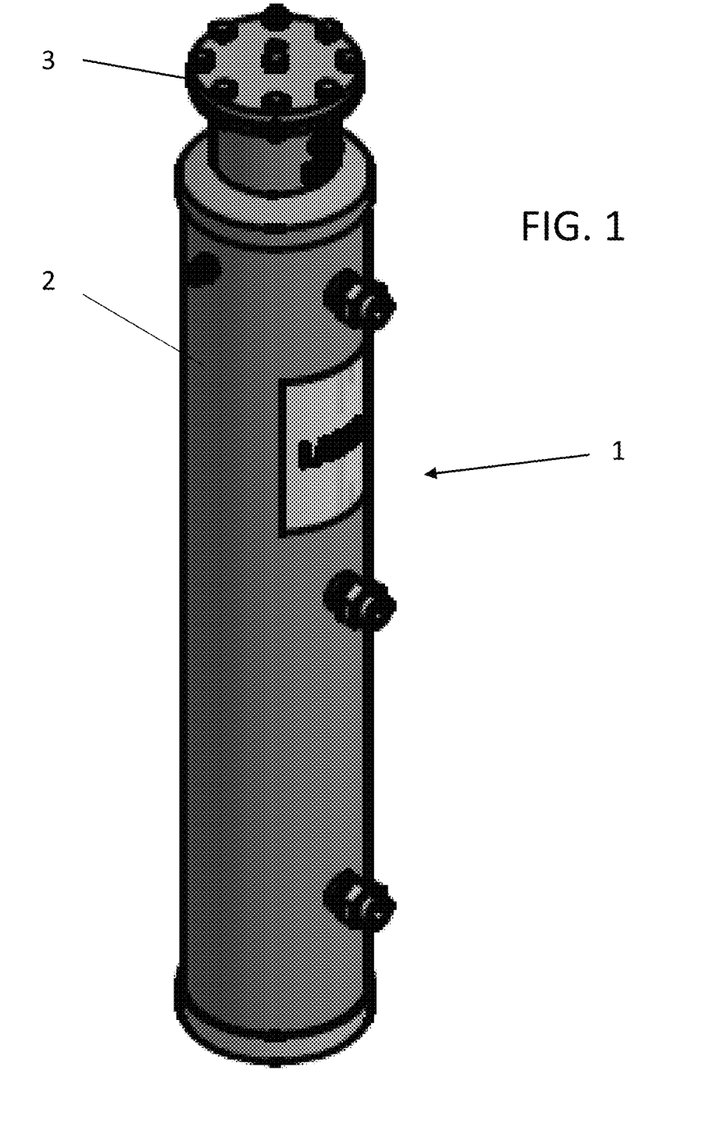
FIG. 1 shows a perspective view of a first embodiment of an oil reservoir assembly with an oil filter housing integrated at the upper portion of the component.

FIG. 1 shows a perspective view of a first embodiment of an oil filter-reservoir assembly, generally designated as 1. The component parts of the assembly are generally similar to those of the second embodiment described below in connection with FIGS. 2-9, except that the relative dimensions of length and width of the assembly are more specifically shown in FIG. 1. In FIG. 1, the ratio of the length of the overall assembly to the diameter of the shell 2 is about 4.8:1 to 4.9:1. The ratio of the length of the shell 2 to the diameter of the shell 2 is about 4.2:1 to 4.3:1.

FIGS. 2-9 show a second embodiment of an oil filter-reservoir assembly 10 with an oil filter housing integrated at the upper portion of the component. The assembly 10 includes a shell 12, which typically is tubular and has length of about 25 to 35 inches and an outer diameter of about 4 to about 20 inches, or about 6 to about 14 inches. A bottom cap 14 is attached to the lower end portion 16 of the shell, and an annular upper terminal end cap 18 is removably attached to the upper end portion 20 of the shell 12. The upper terminal end cap 18 has a central opening 26 configured to receive and support a serviceable oil filter subassembly 28.

The oil filter subassembly 28 has a filter housing 27 that includes a tubular side wall 30, a lower portion 31 of which is configured to be positioned inside the shell 12, and an upper portion 33 of which is configured to be located above the shell 12. A top component or header plate 29 is bolted or otherwise removably attached to the top of the upper portion 33. A lower wall 32 of the oil filter subassembly 28, which is circular in the embodiment shown in the Figures, has an oil outlet 34 having a drain fitting 35 or the like mounted therein that is configured to allow for the passage of oil downwardly through the shell and into the integrated oil reservoir 36. The upper end 37 of the oil filter subassembly 28 is enclosed by a header plate 29. Unfiltered oil that has exited a compressor and passed through an oil separator enters the assembly 10 through an inlet 40 formed in the side wall 30 of the housing 27 of the oil filter subassembly 28. In the embodiment shown in FIGS. 2-9, the inlet 40 has an inlet spud 41 forming a gas-tight connection between the inlet 40 and the inlet line 78 from the oil separator (shown in FIG. 10) connected to a valve 43. The liquid stream containing unfiltered oil enters the oil filtration subassembly 28. Filtered liquid oil exits the oil filter subassembly 28 through the oil outlet 34, moving into the reservoir section 44 of the assembly 10.

Figure 5:
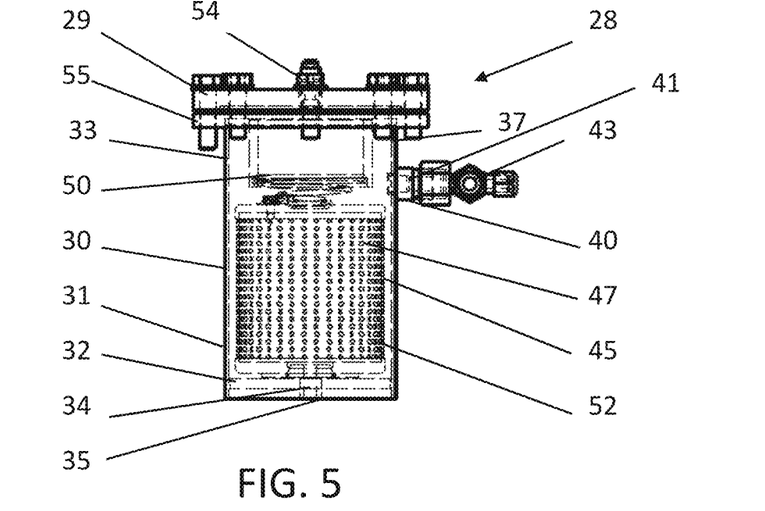
FIG. 5 is a sectional view showing details of the oil filter housing and the main operational components.
Figure 6:
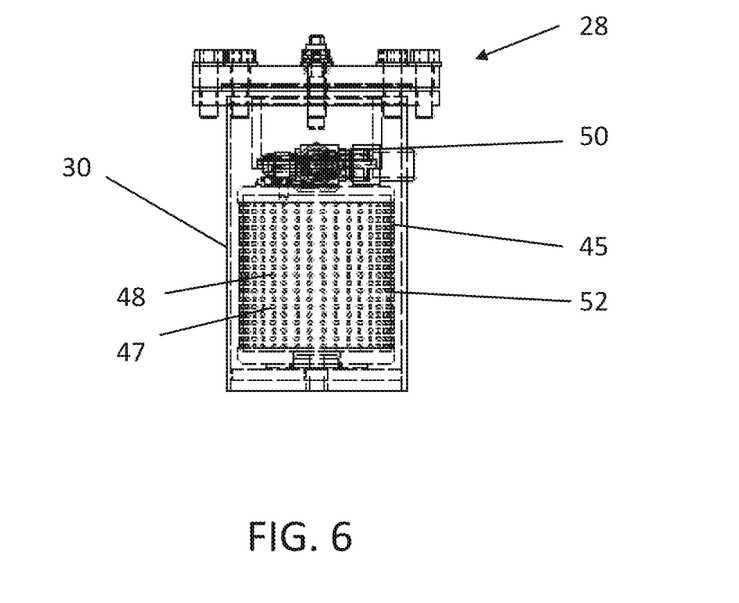
FIG. 6 is a sectional view showing additional details of the serviceable oil filter subassembly containing a slightly different filter cartridge than is shown in FIG. 5.
Figure 7:
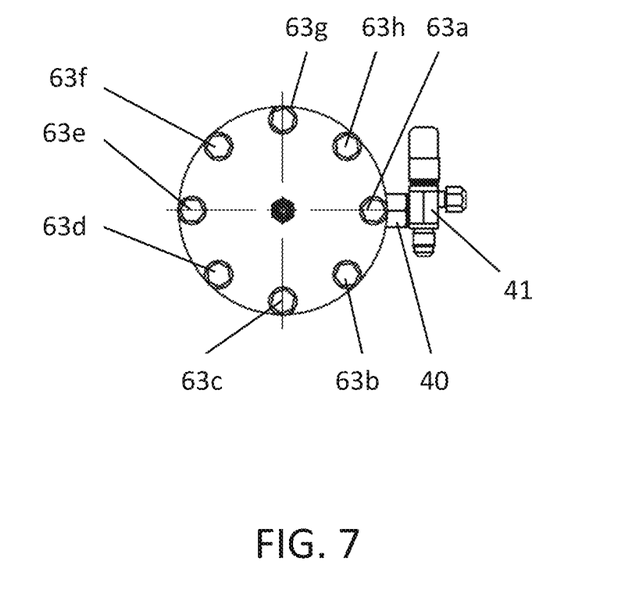
FIG. 7 shows a top view of the serviceable oil filter subassembly.
Figure 8:
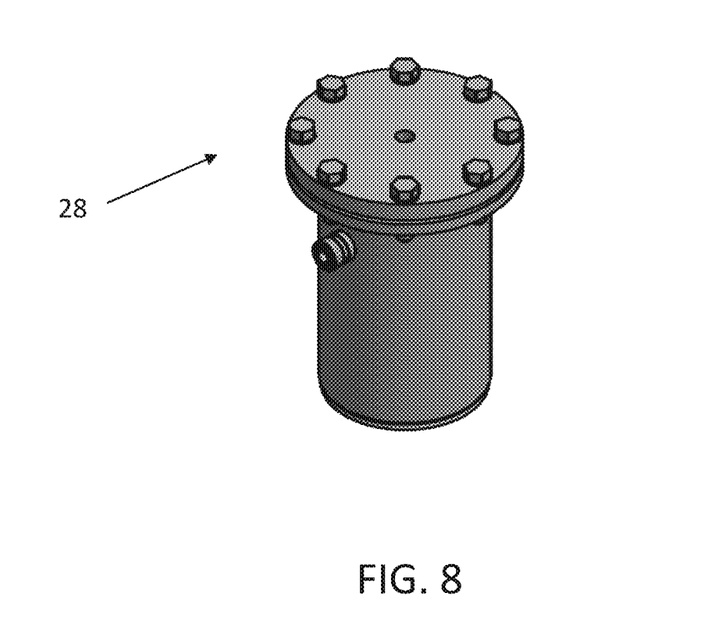
FIG. 8 shows a perspective view of the serviceable oil filter subassembly.
Figure 9:
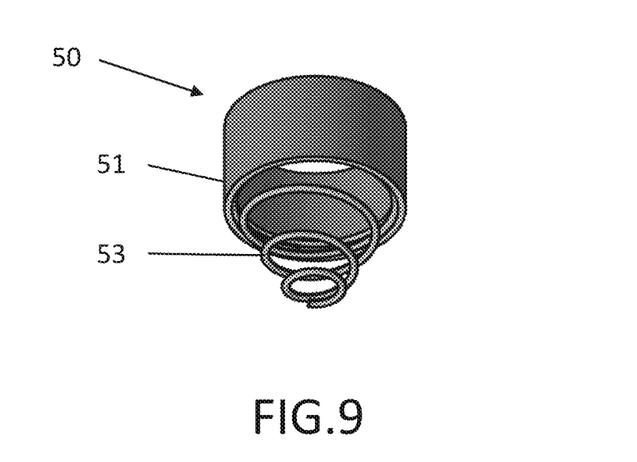
FIG. 9 shows a perspective view of a compression spring used in embodiments described herein.

The oil filter subassembly 28 contains a replaceable filter, depicted as filter media 48 which is contained in a filter media support 45. The filter media support 45 can be an outer wrap with perforations 47, as shown in FIGS. 5-6, through which the filter media 48 can be seen. The filter media support 45 is positioned in the space bordered by the lower wall 32 and a lower portion 49 of the side wall 30. A compression spring 50 is mounted above the filter media section 52 of the oil filter subassembly 28 in the upper end of the oil filter subassembly 28 between the filter media support 45 and the header plate 29. The compression spring 50 keeps the filter media support 45 in place and in contact with the inner surface of the lower wall 32. In the embodiment shown in the figures, the spring 50 includes an upper tubular portion 51 and a lower coiled portion 53. An upper pressure control valve 54 optionally is removably mounted to the header plate 29 to help evacuate the pressure in the assembly as necessary. The header plate 29 is held in place on the top of the tubular side wall 30 using bolts 63a, 63b, 63c, 63d, 63e, 63f, 63g and 63h, which are positioned on a flange 55 formed on the upper end 37 of the side wall 30. When replacement or cleaning of the filter media 48 is required, the service valves are adjusted, as described below in further detail, and the header plate 29 is removed to provide access to the filter media 48.

The shell 12 optionally may include an upper sight glass 58 configured to allow an operator to visually determine when the filtration media is in need of replacement. In the embodiment shown in the figures, an intermediate sight glass 59 optionally is included along the middle section of the shell 12, and a lower sight glass 60 optionally is provided on the lower end portion of the shell 12. In embodiments, a lower spud 61 is welded to the bottom cap 14 to provide a liquid-tight connection between the oil outlet 56 from the assembly 10 and oil outlet line 80. The oil from the oil outlet line 80 can be returned to the compressor directly, disposed, or further treated and then returned to the compressor.

Figure 2:
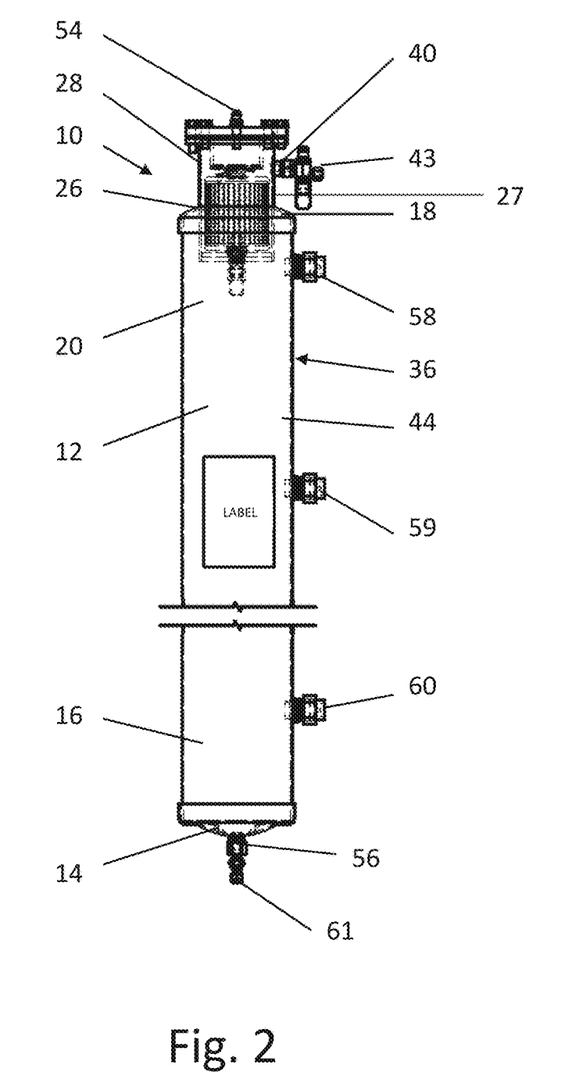
FIG. 2 shows a front side elevational view of a second embodiment.
Figure 3:
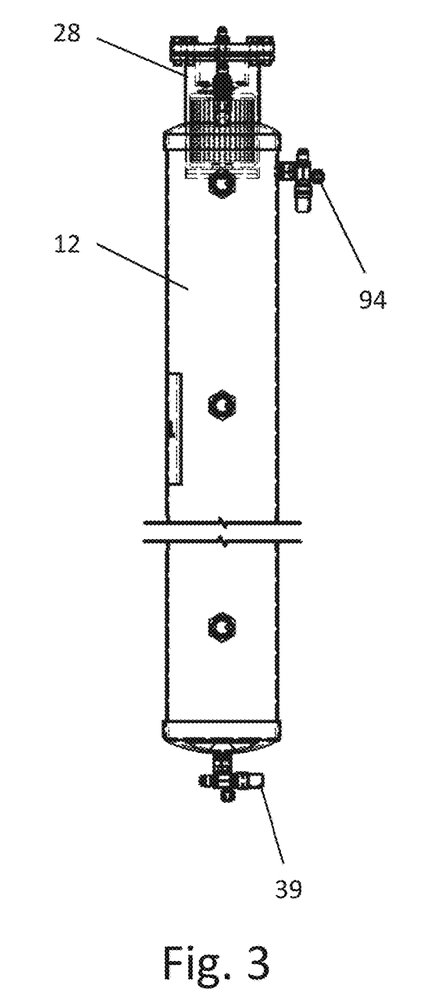
FIG. 3 shows a right side elevational view of the embodiment of FIG. 2.
Figure 4:
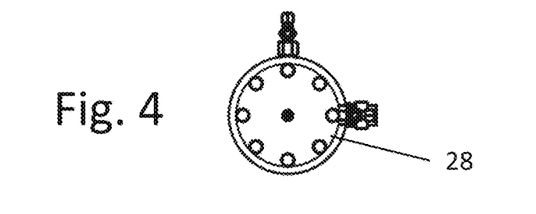
FIG. 4 shows a top view of the embodiment of FIG. 2.

In some cases, as is shown in FIGS. 2-3, the diameter of the tubular side wall 30 of the oil filter subassembly 28 is smaller than the diameter of the shell 12 of the oil filter-reservoir assembly. In some cases, the diameter of the tubular side wall 30 is about 3-5 inches and the diameter of the shell 12 is about 5 to 14 inches, or about 6 to 9 inches. In embodiments, the ratio of the diameter of the shell 12 to the diameter of the tubular side wall 30 is in the range of about 1.2:1 to about 2.2:1, or about 1.3:1 to about 2:1, or about 1.4:1 to about 1.6:1.

Figure 10:
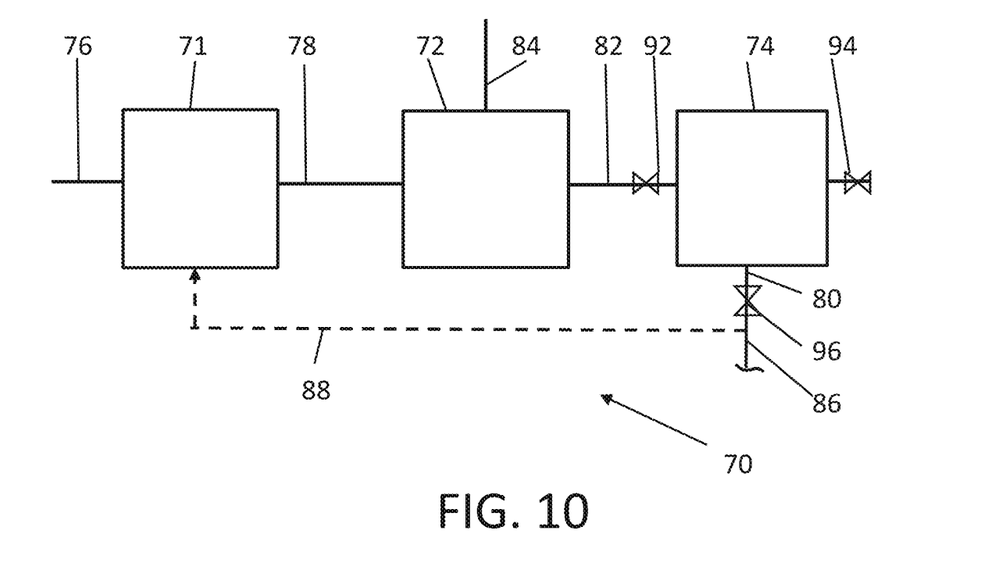
FIG. 10 schematically depicts a system that incorporates the embodiment of FIG. 2.

FIG. 10 schematically shows a system 70 that includes a compressor 71, an oil separator 72 and an oil filter-reservoir assembly 74. Gaseous refrigerant enters the compressor 71 in refrigerant line 76. A compressor outlet line 78 contains compressed gaseous refrigerant with small quantities of gaseous oil from the compressor 71. The gaseous mixture in line 78 enters the oil separator 72 in which separated oil is removed as a liquid and returned in oil outlet line 82 and gaseous refrigerant is removed in a refrigerant outlet line 84. The refrigerant is fed to a condenser (not shown) from which liquid refrigerant is removed. The separated oil in line 82 is fed to an oil filter-reservoir assembly 74. The filtered oil removed from assembly 74 in line 80 can be transported in line 86 for further processing or can be returned to the compressor in line 88.

When the filter in the oil filter-reservoir assembly 74 is in need of servicing, valve 92, which is upstream from the oil filter-reservoir assembly 74 in line 82 and filtered oil outlet valve 96 which is downstream from the oil filter-reservoir assembly 74 in line 80 are closed. Vent valve 94 also is closed when servicing. Once the valve 54 is used to relieve the internal pressure of assembly 74, the header plate 29 of the oil filter-reservoir assembly 74 can then be removed and the filter can be replaced, repositioned and/or cleaned.

Figure 11:
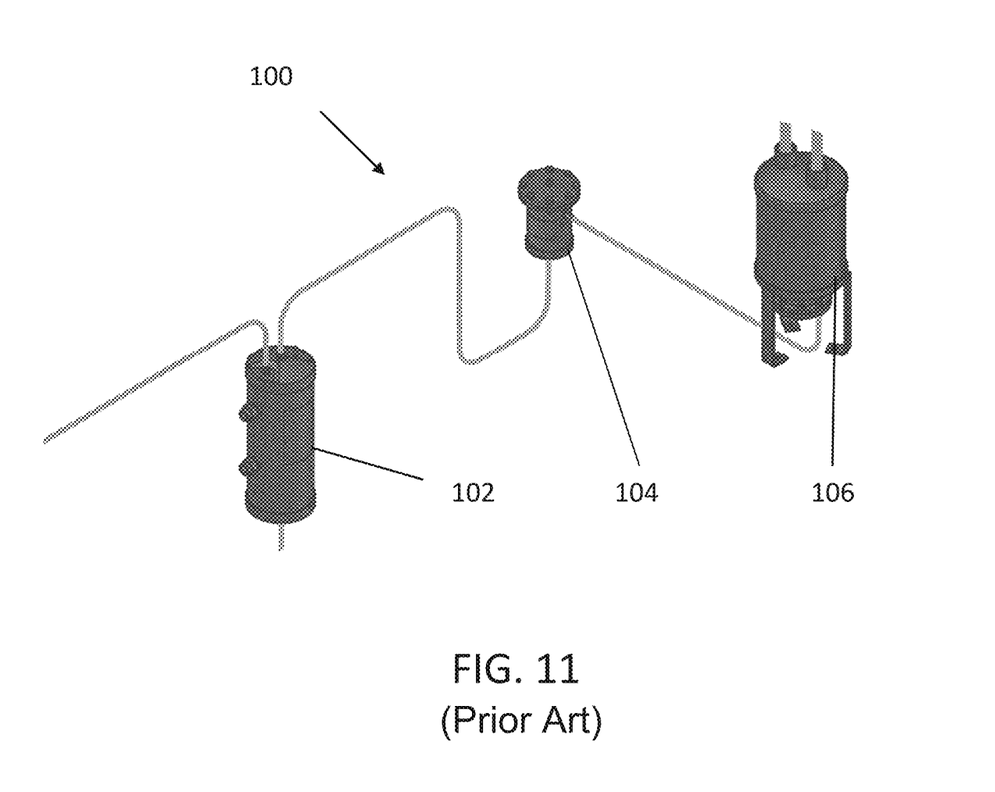
FIG. 11 shows a portion of a conventional oil management system in a refrigeration system and the relation of the separate components.

FIG. 11 shows a conventional system, designated as 100, in which the oil filter 104 and oil reservoir 102 are two separate components. This drawing also shows an oil separator housing 106 upstream from the oil filter 104. In this embodiment, additional lines are required to accommodate the flow of fluid from the oil filter 104 to the oil reservoir 104.

In embodiments, the system is designed with a maximum working pressure in the range of about 300 to about 2200 psig, or about 400 to about 1900 psig. In some embodiments, the system is designed with a maximum working pressure of 350 psig to 500 psig, or 400 psig to 480 psig. In certain cases, the system is designed with a maximum working pressure of about 500 to 800 psig, or about 600 to 700 psig. In other cases, the system is designed with a maximum working pressure of about 1600 to 2200 psig, or about 1700 to 2000 psig. The components are constructed with thicker walls when higher pressures are used.

In some cases, the oil reservoir has a capacity of about 1 to about 15 gallons of oil, or about 2 to about 10 gallons of oil, or about 2 to about 5 gallons of oil. In embodiments, the filtration media comprises at least one member selected from the group consisting of paper, fiberglass, a thermoplastic material, a thermoset material, and combinations thereof. The filtration media is held in place by a filtration media support. In some cases, the filter cartridge or filtration media is held in place by at least one of a spring (shown in the figures), a rod and a piston.

In embodiments, the shell 12 has a length in the range of about 25 to about 45 inches, or about 30 to about 40 inches, or about 30 to about 35 inches, and an outer diameter in the range of about 4 to about 14 inches, or about 4 to about 8 inches, or about 5 to about 7 inches. In embodiments, the shell 12 has a (length) to (outer diameter) ratio in the range of about 3.5:1 to about 8:1, or about 4:1 to about 6:1, or about 4.5:1 to about 6:1. In embodiments, the tubular shell has a cross-section that is circular, rectangular or oval-shaped. In embodiments, the filter housing has a cross section that is circular, rectangular or oval-shaped. In embodiments, the filter includes a plurality of folds or flutes.

In embodiments, the filter area is in the range of about 250 to about 400 square inches, or about 300 to about 350 square inches, or about 325 to about 340 square inches. In embodiments, the filtration media removes particles of about 100 microns or more, or about 40 microns or more, or about 4 microns or more. In some cases, the filtration media is selected to remove particles of about 3 microns or more, or about 1 micron or more. In some cases, the system is configured to have an efficiency of 95%, or 99%, or 99.5% at removing 5 micron particles and larger. In embodiments, the filtration media is stationary during filtration.

A number of alternatives, modifications, variations, or improvements therein may be subsequently made by those skilled in the art, which are also intended to be encompassed by the following claims.

What is claimed is:

1. An oil filtration-reservoir assembly, comprising:
   a. a container having an upper end portion and a lower end portion,
   b. an oil reservoir formed on the lower end portion of the container, the oil reservoir including an oil reservoir outlet,
   c. a removable oil filter subassembly integrated with the upper end portion of the container, the subassembly comprising:
      a filter housing including an inlet configured to receive oil, and a filtered oil outlet configured to permit an outward flow of oil into the oil reservoir,
      a filter in the housing and disposed between the inlet and the filtered oil outlet, and
      a top component mounted directly to the filter housing and being removable for replacement of filter media without removing the filter housing,
   d. an inlet service valve disposed outside the filter housing and configured to control flow through the filter housing inlet, and
   e. an oil outlet service valve disposed outside the container configured to control flow through the filtered oil outlet.

2. The assembly of claim 1, wherein the upper end portion of the container comprises an annular terminal end cap with a central opening, the filter housing is disposed in the central opening of the annular terminal end cap and partially extends longitudinally above the annular terminal end cap, and a leak-proof seal is included between the annular terminal end cap and the filter housing.

3. The assembly of claim 1, further comprising a vent valve fluidly connected to the container.

4. The assembly of claim 1, wherein the filter is supported by a cartridge.

5. The assembly of claim 1, wherein the filter comprises filtration media configured to remove particles having a size of 1 micron or more.

6. The assembly of claim 1, wherein the filter comprises filtration media configured to remove particles having a size of 3 microns or more.

7. The assembly of claim 1, wherein the filter comprises filtration media configured to remove particles having a size of 5 microns or more.

8. The assembly of claim 1, wherein the filter comprises filtration media configured to remove particles having a size of 40 microns or more.

9. The assembly of claim 1, wherein the filter comprises at least one member selected from the group consisting of paper, fiberglass, a thermoplastic material, a thermoset material, and combinations thereof.

10. The assembly of claim 1, wherein the filter is held in place by a filtration media support.

11. The assembly of claim 10, wherein the filtration media support is held in place by at least one of a spring, a rod and a piston.

12. The assembly of claim 1, wherein the assembly is configured to operate at a pressure in the range of about 300 to about 2200 psig.

13. The assembly of claim 1, wherein the assembly is configured to operate at a pressure in the range of about 300 to about 550 psig.

14. The assembly of claim 1, wherein the assembly is configured to operate at a pressure in the range of about 400 to about 800 psig.

15. The assembly of claim 1, wherein the assembly is configured to operate at a pressure in the range of about 1700 to about 2200 psig.

16. The assembly of claim 1, wherein the filtration media is stationary during filtration.

17. A system comprising an oil separator fluidly connected to the oil filtration-reservoir assembly of claim 1.

18. A method of making a refrigeration system comprising constructing the assembly of claim 1 and connecting the assembly to a refrigeration system downstream from an oil separator and upstream from a compressor.

19. A method, comprising:
obtaining an oil filtration-reservoir assembly, comprising:
   a. a container having an upper end portion and a lower end portion,
   b. an oil reservoir formed at the lower end portion of the container, the oil reservoir including an oil reservoir outlet,
   c. a removable oil filter subassembly integrated with the upper end portion of the container, the subassembly comprising:
      a filter housing including an inlet configured to receive oil, and a filtered oil outlet configured to permit an outward flow of filtered oil into the oil reservoir,
      a filter cartridge contained in the housing and disposed between the inlet and the filtered oil outlet, and
      a top component mounted directly to the filter housing and being removable for replacement of filter media without removing the filter housing,
feeding unfiltered oil into the filter housing inlet, and
removing filtered oil from the oil reservoir outlet.

20. An oil filtration-reservoir assembly, comprising:
   a. a container having an upper end portion comprising an annular terminal end cap with a central opening, and a lower end portion,
   b. an oil reservoir formed on the lower end portion of the container, the oil reservoir including an oil reservoir outlet,
   c. a removable oil filter subassembly integrated with the upper end portion of the container and extending longitudinally above the annular terminal end cap, the subassembly comprising:
      a filter housing permanently mounted to the container, the filter housing including an inlet configured to receive oil, and a filtered oil outlet configured to permit an outward flow of oil into the oil reservoir,
      a filter contained in the housing and disposed between the inlet and the filtered oil outlet, and
      a top component mounted directly to the filter housing, the top component being positioned above the annular terminal end cap and being configured to be removed for replacement of the filter,
   d. an inlet service valve disposed outside the filter housing and configured to control flow through the filter housing inlet, and
   e. an oil outlet service valve disposed outside the container configured to control flow through the filtered oil outlet.

21. The assembly of claim 20, further comprising a vent valve fluidly connected to the container.

* * * * *